United States Patent
Zhang et al.

(10) Patent No.: US 11,133,742 B2
(45) Date of Patent: Sep. 28, 2021

(54) SWITCHED CAPACITOR CONVERTER, CURRENT CONTROL CIRCUIT AND CURRENT CONTROL METHOD THEREOF

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/916,405

(22) Filed: Jun. 30, 2020

(65) Prior Publication Data

US 2021/0013799 A1    Jan. 14, 2021

(30) Foreign Application Priority Data

Jul. 9, 2019  (CN) .......................... 201910616024.2

(51) Int. Cl.
| | |
|---|---|
| *G05F 5/00* | (2006.01) |
| *H02M 3/07* | (2006.01) |
| *H02M 3/158* | (2006.01) |
| *H02M 1/00* | (2006.01) |

(52) U.S. Cl.
CPC ............ *H02M 3/07* (2013.01); *H02M 3/1588* (2013.01); *H02M 1/009* (2021.05); *H02M 3/072* (2021.05)

(58) Field of Classification Search
CPC ................. H02M 3/07; H02M 3/1588; H02M 2003/072; H02M 2001/009
USPC ....................................................... 327/537
See application file for complete search history.

(56) References Cited

U.S. PATENT DOCUMENTS

| | | |
|---|---|---|
| 5,581,454 A | 12/1996 | Collins |
| 7,615,940 B2 | 11/2009 | Qiu et al. |
| 7,696,735 B2 | 4/2010 | Oraw et al. |
| 7,907,429 B2 | 3/2011 | Ramadass et al. |
| 8,325,453 B2 | 12/2012 | Groenewold |
| 8,427,113 B2 | 4/2013 | King et al. |
| 8,687,382 B2 | 4/2014 | Chen |
| 8,729,819 B2 | 5/2014 | Zhou et al. |
| 8,917,528 B2 | 12/2014 | Xu |
| 9,287,782 B2 | 3/2016 | Chen |
| 9,473,034 B2 | 10/2016 | Huang et al. |
| 9,762,128 B2 | 9/2017 | Zhang et al. |
| 9,853,460 B2 | 12/2017 | Ichikawa et al. |
| 10,256,729 B1* | 4/2019 | Notsch ................ H02M 3/1588 |
| 10,673,325 B2* | 6/2020 | Zhang .................. H02M 3/158 |

(Continued)

FOREIGN PATENT DOCUMENTS

| | | |
|---|---|---|
| CN | 204696914 U | 10/2015 |
| JP | 2014-212654 A | 11/2014 |

*Primary Examiner* — Ryan Jager
(74) *Attorney, Agent, or Firm* — Michael C. Stephens, Jr.

(57) ABSTRACT

A current control circuit can include: a current detection circuit configured to obtain a current detection signal for characterizing an output current of a switched capacitor converter, where the switched capacitor converter includes a plurality of first switch groups coupled between an input terminal and a ground, and where each first switch group comprises two switches coupled in series; and a voltage regulation circuit configured to regulate the output current by adjusting an equivalent impedance of the switched capacitor converter in accordance with the current detection signal.

19 Claims, 8 Drawing Sheets

(56) References Cited

U.S. PATENT DOCUMENTS

| | | | |
|---|---|---|---|
| 2008/0239772 A1* | 10/2008 | Oraw | H02M 3/07 363/60 |
| 2009/0316443 A1 | 12/2009 | Coccia et al. | |
| 2012/0300519 A1* | 11/2012 | Clemmons | H02M 7/2173 363/127 |
| 2013/0039100 A1* | 2/2013 | Kazama | H03K 17/164 363/41 |
| 2013/0181620 A1 | 7/2013 | Zhao | |
| 2013/0201730 A1 | 8/2013 | Luo | |
| 2013/0265016 A1 | 10/2013 | Chang et al. | |
| 2017/0085131 A1* | 3/2017 | Liu | H03H 7/38 |
| 2018/0198367 A1 | 7/2018 | Zhang et al. | |
| 2020/0204070 A1* | 6/2020 | Schwabe | H02M 3/07 |
| 2020/0218300 A1* | 7/2020 | Zhang | G05F 1/575 |

* cited by examiner

SWITCHED CAPACITOR CONVERTER, CURRENT CONTROL CIRCUIT AND CURRENT CONTROL METHOD THEREOF

RELATED APPLICATIONS

This application claims the benefit of Chinese Patent Application No. 201910616024.2, filed on Jul. 9, 2019, which is incorporated herein by reference in its entirety.

FIELD OF THE INVENTION

The present invention generally relates to the field of power electronics, and more particularly to switched capacitor converters, and associated current control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
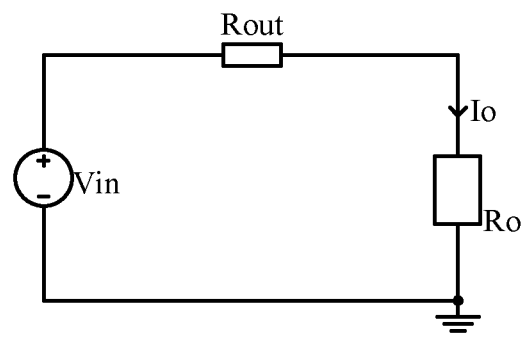
FIG. 1 is a schematic block diagram of an example equivalent circuit of a switched capacitor converter.

A switched capacitor converter realizes voltage conversion by controlling the charging and discharging of capacitors via switches. Referring now to FIG. 1, shown is a schematic block diagram of an example equivalent circuit for a switched capacitor converter. The switched capacitor converter can be equivalent to an equivalent output impedance Rout, which is connected in series between input voltage Vin and load Ro. If input voltage Vin fails to be greater than its rated voltage, the output current Io will also be greater than its rated current, which may damage the load and cause potential safety hazards. Therefore, it is necessary to control the output current below the rated current. For a switched capacitor converter, output current Io can be adjusted by adjusting the value of the equivalent output impedance Rout.

In one embodiment, a current control circuit can include: (i) a current detection circuit configured to obtain a current detection signal for characterizing an output current of a switched capacitor converter, where the switched capacitor converter includes a plurality of first switch groups coupled between an input terminal and a ground, and where each first switch group comprises two switches coupled in series; and (ii) a voltage regulation circuit configured to regulate the output current by adjusting an equivalent impedance of the switched capacitor converter in accordance with the current detection signal.

Figure 2:
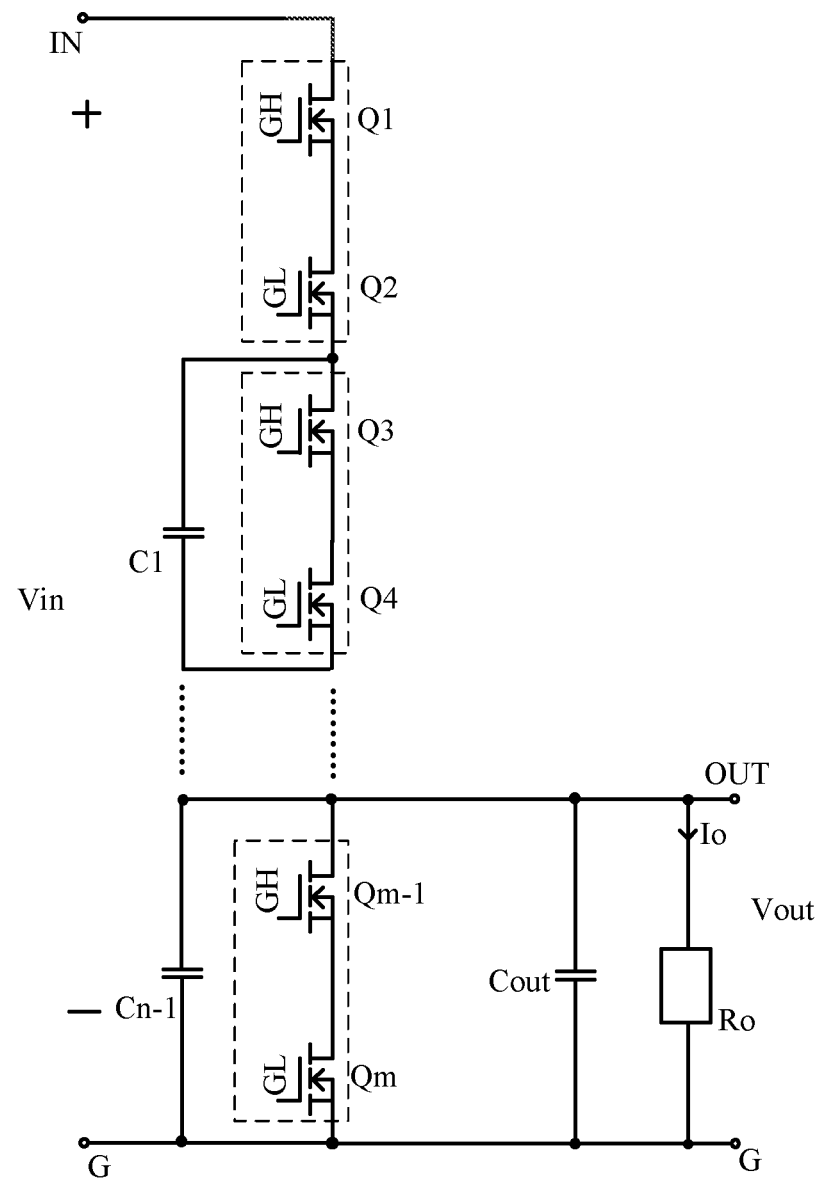
FIG. 2 is a schematic block diagram of a first example switched capacitor converter, in accordance with embodiments of the present invention.

Referring now to FIG. 2, shown is a schematic block diagram of a first example switched capacitor converter, in accordance with embodiments of the present invention. In this particular example, the switched capacitor converter can include a plurality of "first" switch groups, coupled in series between input terminal IN and ground G. In this example, the switched capacitor converter can include "n" first switch groups, where n is an integer greater than 1. Each first switch group can include two switches coupled in series. In this example, the first switch group can include switches Q1 and Q2, the second first switch group can include switches Q3 and Q4, . . . , and the nth first switch group can include Qm−1 and Qm (m=2n). The switched capacitor converter can also include a plurality of first capacitors C1 to Cn−1. In some examples, first capacitors C1 to Cn−1 may be respectively coupled in parallel with a corresponding first switch group. In other examples, first capacitors C1 to Cn−1 may respectively be coupled between intermediate nodes of two adjacent first switch groups (not shown). Also, load Ro can be coupled in parallel with two terminals of the nth first switch group between output terminal OUT and ground G. Further, output capacitor Cout may also be coupled in parallel with load Ro. In this particular example, output voltage Vout is equal to Vin/n.

Figure 3:
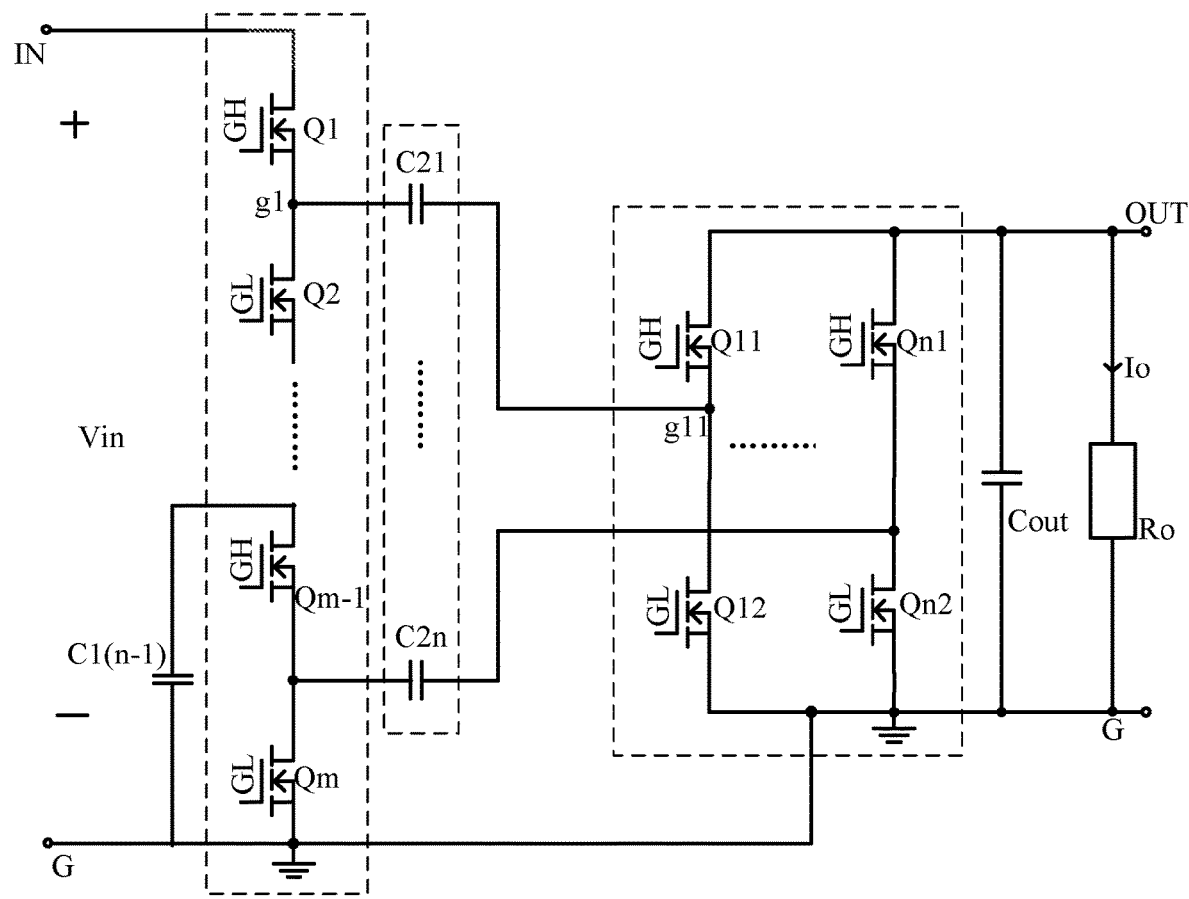
FIG. 3 is a schematic block diagram of a second example switched capacitor converter, in accordance with embodiments of the present invention.

Referring now to FIG. 3, shown is a schematic block diagram of a second example switched capacitor converter, in accordance with embodiments of the present invention. In this particular example, a primary side of the switched capacitor converter can include a plurality of first switch groups, coupled in series between input terminal IN and ground G. For example, the number of the first switch group is n, where n is an integer greater than 1. Each of the first switch groups can include two switches coupled in series.

The first switch group can include switches Q1 and Q2, . . . , the nth first switch group can include Qm−1 and Qm (m=2n). Further, a secondary side of the switched capacitor converter can include a plurality of second switch groups, coupled in parallel between output terminal OUT and ground G. Each of the second switch groups can include two switches coupled in series. For example, the number of the second switch groups is n.

The first switch group can include switches Q11 and Q12, . . . , the nth second switch group can include switches Qn1 and Qn2. In this particular example, the number of the second switch groups corresponds to (e.g., is the same as) the number of the first switch groups. Also, the reference ground of the primary side of ground and the reference ground of the secondary side may all be the same ground G. In addition, the switched capacitor converter can also include a plurality of filter capacitors C11 to C1(n−1), each of which is respectively coupled in parallel with corresponding first switch group. In other examples, filter capacitors C11 to C1(n−1) may respectively be coupled between intermediate nodes of two adjacent first switch groups. Further, the switched capacitor converter can include a plurality of isolated capacitors C21-C2n. Each of the isolated capacitors may respectively be coupled between intermediate nodes of one corresponding first switch group and one corresponding second switch group. For example, isolated capacitor C21 can be coupled between intermediate node g1 and intermediate node g11. Load Ro can be coupled in parallel with the second switch groups between output terminal OUT and ground G.

Figure 4:
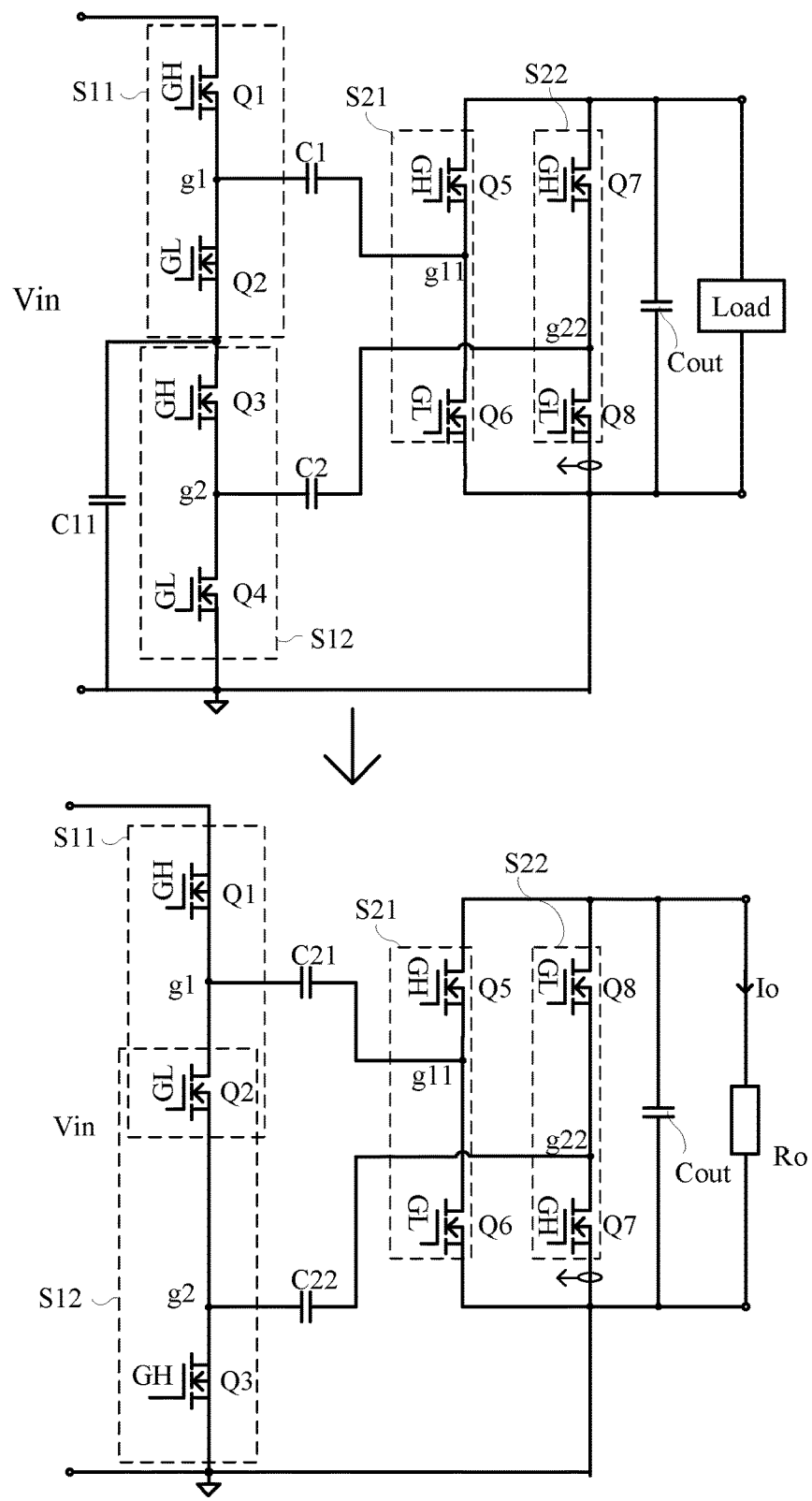
FIG. 4 is a schematic block diagram of a third example switched capacitor converter, in accordance with embodiments of the present invention.

Referring now to FIG. 4, shown is a schematic block diagram of the third example switched capacitor converter, in accordance with embodiments of the present invention. For the second example switched capacitor converter with n=2, the switched capacitor converter can include two first switch groups and two second switch groups. First switch group S11 can include switches Q1 and Q2 and switch group S12 can include switches Q3 and Q4. Second switch group S21 can include switches Q5 and Q6, and second switch group S22 can include switches Q7 and Q8. Further, the switched capacitor converter can include filter capacitor C11 coupled in parallel with switch group S12, isolated capacitor C21 coupled between intermediate nodes g1 and g11, and isolated capacitor C22 coupled between intermediate nodes g2 and g22.

In order to decrease the number of switches to reduce the cost, the second example switched capacitor converter can be turned into another structure as the third example switched capacitor converter. For example, after switch groups S12 and S22 are turned upside down, switch group S12 can be coupled in series with first switch group S11 again with switch Q4 at upper side, and switch group S22 may be coupled in parallel with second switch group S12 again with switch Q8 at upper side. The drive signals of switches Q2 and Q4 are both GL, so they can be combined together, such that one of the two switches can be saved (e.g., switch Q4 is saved) to form another topology without affecting the normal operation of the switched capacitor converter.

In this particular example, two first switch groups can be formed by sharing switch Q2. The first of the first switch group can include switches Q1 and Q2, and the second of the first switch group can include switches Q2 and Q3. Also, isolated capacitor C21 can be coupled between intermediate node g1 of switches Q1 and Q2 and intermediate node g11 of switches Q5 and Q6. Isolated capacitor C22 can be coupled between intermediate node g2 of switches Q2 and Q3 and intermediate node g22 of switches Q8 and Q7. In addition, filter capacitor C11 can be omitted in this case.

Figure 5:
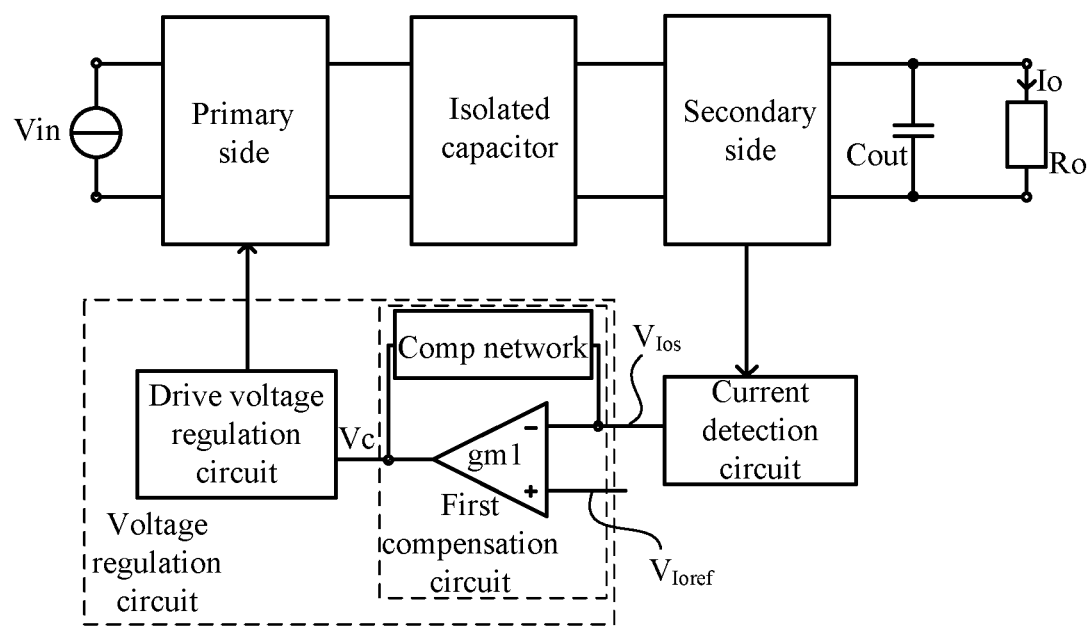
FIG. 5 is a schematic block diagram of an example current control circuit, in accordance with embodiments of the present invention.

Referring now to FIG. 5, shown is a schematic block diagram of an example current control circuit, in accordance with embodiments of the present invention. This particular example current control circuit can include a current detection circuit and a voltage regulation circuit. The example current detection circuit can directly sample output current Io (i.e., load current) to generate current detection signal $V_{Ios}$. For example, the current detection circuit can also generate current detection signal $V_{Ios}$ characterizing output current Io by sampling the current of any one of the switches in the first switch group connected to ground G. For the second and third example switched capacitor converters, the current detection circuit can also obtain current detection signal $V_{Ios}$ characterizing output current Io by sampling the current of any one of the switches in the second switch group.

The voltage regulation circuit can include a first compensation circuit and a drive voltage control circuit. The first compensation circuit can generate compensation signal Vc according to current detection signal $V_{Ios}$ and predetermined value $V_{Ioref}$. In this example, the first compensation circuit can include error amplifier gm1 and a compensation network. For example, a non-inverting input terminal of error amplifier gm1 can receive predetermined value $V_{Ioref}$, an inverting input terminal of error amplifier gm1 can receive current detection signal $V_{Ios}$, and an output terminal may generate compensation signal Vc. The drive voltage control circuit can receive compensation signal Vc, and may adjust the drive voltage of at least one switch in the first switch group according to compensation signal Vc. When current detection signal $V_{Ios}$ is greater than predetermined value $V_{Ioref}$, compensation signal Vc generated through the compensation network decreases, thereby reducing the drive voltage of the switch in the first switch group.

Therefore, the on-resistance of the switch can become larger to increase the equivalent output impedance of the switched capacitor converter, thereby reducing output current Io. Finally, output current Io may be limited to the rated current. When current detection signal $V_{Ios}$ is less than predetermined value $V_{Ioref}$, compensation signal Vc can increase, thereby increasing the drive voltage of the switch. Then, the on-resistance of the switch may become smaller to decrease the equivalent output impedance of the switched capacitor converter, thereby increasing output current Io. It should be understood that compensation signal Vc is limited by a maximum value. When it increases to the maximum value, it can be clamped at the maximum value and then may not continue to increase. Further, those skilled in the art will recognize that the drive voltage control circuit can adjust the drive voltage of at least one switch in the first switch group according to compensation signal Vc, in order to change the equivalent output impedance of the switched capacitor converter, such that the output current cannot exceed the rated current.

Figure 6:
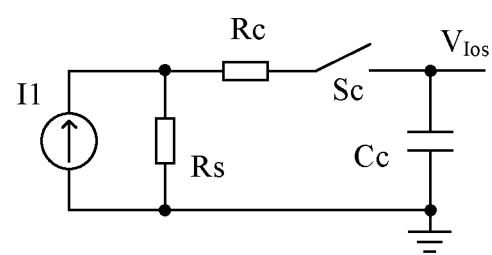
FIG. 6 is a schematic block diagram of an example current detection circuit, in accordance with embodiments of the present invention.

Referring now to FIG. 6, shown is a schematic block diagram of an example current detection circuit, in accordance with embodiments of the present invention. Whether the current of the switch in the first switch group connected to ground G is sampled or the current of the switch in the second switch group is sampled, the sampled current may be processed by filtering to obtain current detection signal $V_{Ios}$ that characterizes output current Io. For example, the current of switch Q7 of the third example switched capacitor converter can be sampled. The current detection circuit can include a current sampling circuit and a filter circuit. The current sampling circuit can sample the current flowing the switch when the switch is turned on and convert the current into a voltage signal. The filter circuit can filter the voltage signal when the switch is turned off, in order to obtain the current detection signal. For example, the current sampling circuit can include a current mirror circuit and resistor Rs.

The filter circuit can include an RC filter and switch Sc. When switch Q7 is turned on, the current flowing through switch Q7 may be sampled by the current mirror circuit to obtain current I1, which can be converted into the voltage signal via resistor Rs. Also, switch Sc may be controlled to be turned on when switch Q7 is turned off, in order to filter the voltage signal on resistor Rs. After the voltage signal is filtered by the RC filter including resistor Rc and capacitor Cc, current detection signal $V_{Ios}$ can be formed on capacitor Cc to characterize output current Io. It should be understood that this only provides one current detection circuit as an example, and other current detection circuits that can obtain the output current may also be applied in certain embodiments, such as sampling with a series resistor.

Figure 7:
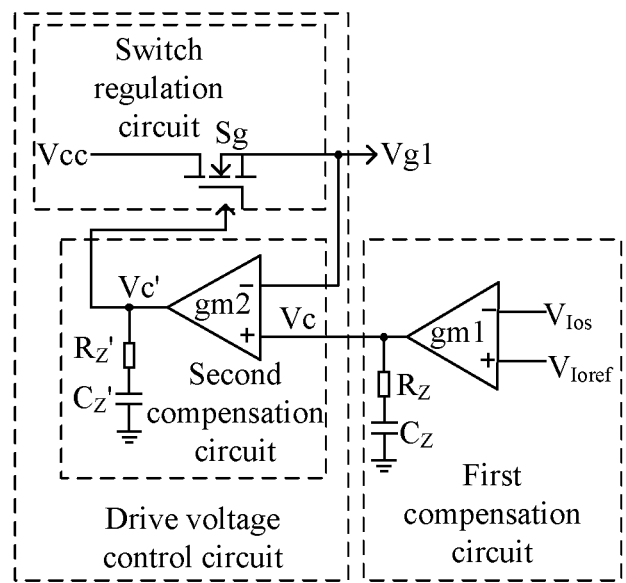
FIG. 7 is a schematic block diagram of an example drive voltage control circuit, in accordance with embodiments of the present invention.

Referring now to FIG. 7, shown is a schematic block diagram of an example drive voltage control circuit, in accordance with embodiments of the present invention. The voltage regulation circuit can include a first compensation circuit and a drive voltage control circuit. The first compensation circuit can include error amplifier gm1 and a compensation network. For example, a non-inverting input terminal of error amplifier gm1 can receive predetermined value $V_{Ioref}$, an inverting input terminal of error amplifier gm1 can receive current detection signal $V_{Ios}$, and an output terminal may generate compensation signal Vc after compensation by the compensation network formed by resistor RZ and capacitor CZ. The drive voltage control circuit can receive compensation signal Vc, in order to adjust the drive voltage of the switch.

In this example, the drive voltage control circuit can include a second compensation circuit and a switch regulation circuit. The second compensation circuit can include error amplifier gm2. For example, a non-inverting input terminal of error amplifier gm2 can receive compensation signal Vc, an inverting input terminal of error amplifier gm2 can receive drive voltage signal Vg1, and an output terminal may generate compensation signal Vc' after compensation via a compensation network including resistor RZ' and capacitor CZ'. The switch regulation circuit can include regulation switch Sg. Here, a first power terminal of regulation switch Sg can receive voltage source Vcc, a second power terminal of regulation switch Sg may generate drive voltage signal Vg1, and a control terminal can be controlled by compensation signal Vc' to adjust the conduction voltage drop of regulation switch Sg, such that drive voltage signal Vg1 is adjusted, thereby adjusting the drive voltage of the corresponding switch in the first switch group. That is, the drive voltage control circuit in this example may utilize a low dropout linear regulator (LDO) to adjust the drive voltage. It should be understood that this only provides one particular example circuit for adjusting the drive voltage according to the first compensation signal, and any other circuit that can realize this function may also be utilized in certain embodiments.

In one embodiment, a current control method can include: (i) obtaining a current detection signal for characterizing an output current of a switched capacitor converter, where the switched capacitor converter includes a plurality of first switch groups coupled between an input terminal and a ground, and where each first switch group comprises two switches coupled in series; and (ii) regulating the output current by adjusting an equivalent impedance of the switched capacitor converter.

Figure 8:
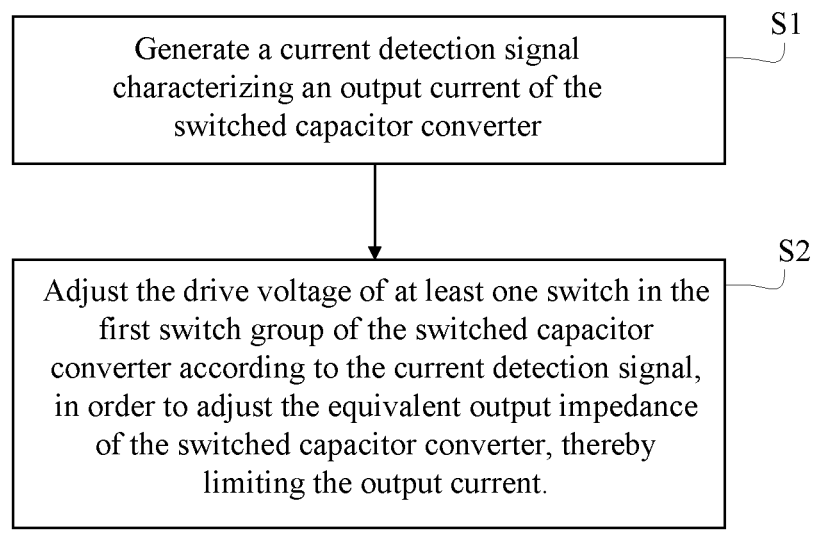
FIG. 8 is a flow diagram of an example current control method, in accordance with embodiments of the present invention.

Referring now to FIG. 8, shown is a flow diagram of an example current control method, in accordance with embodiments of the present invention. For example, at S1, a current detection signal characterizing an output current of the switched capacitor converter can be obtained. It should be understood that there are many ways to obtain the current detection signal. For example, the output current can be directly sampled. Also, the current of any one switch in the first switch group connected to the ground can be sampled to obtain the current detection signal. Further, the current of any switch in the second switch group can also be sampled to obtain the current detection signal.

For example, when the switch is turned on, the current flowing through the switch can be sampled and converted into a voltage signal. When the switch is turned off, the voltage signal may be filtered to obtain the current detection signal representing the output current. At S2, the drive voltage of at least one switch in the first switch group of the switched capacitor converter may be adjusted according to the current detection signal, in order to adjust the equivalent output impedance of the switched capacitor converter, thereby limiting the output current. For example, the first compensation signal (e.g., Vc) can be generated according to the current detection signal and the predetermined value. Then, the drive voltage of at least one switch in the first switch group of the switched capacitor converter may be adjusted according to the first compensation signal.

As described above, by generating the first compensation signal according to the predetermined value and the current detection signal characterizing the output current of the switched capacitor converter, the drive voltage of at least one switch in the first switch group of the switched capacitor converter may be adjusted according to the first compensation signal, such that the output current can be adjusted below a rated current.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A current control circuit, comprising:
   a) a current detection circuit configured to obtain a current detection signal for characterizing an output current of a switched capacitor converter, wherein the switched capacitor converter comprises a plurality of first switch groups coupled between an input terminal and a ground, and wherein each first switch group comprises two switches coupled in series; and
   b) a voltage regulation circuit comprising a drive voltage control circuit configured to adjust a drive voltage of at least one switch in the first switch group to regulate the output current by adjusting an equivalent impedance of the switched capacitor converter in accordance with the current detection signal.

2. The current control circuit of claim 1, wherein a load is coupled in parallel with the first switch group that is connected to the ground.

3. The current control circuit of claim 2, wherein the switched capacitor converter further comprises a plurality of filter capacitor, respectively coupled in parallel with corresponding first switch group or respectively coupled between intermediate nodes of two adjacent first switch groups.

4. The current control circuit of claim 2, wherein the current detection circuit is configured to sample a current flowing through any one of the switches in the first switch group connected to the ground, in order to generate the current detection signal.

5. The current control circuit of claim 4, wherein the current detection circuit comprises:
   a) a current sampling circuit configured to sample the current flowing the switch when the switch is turned on and convert the current into a voltage signal; and
   b) a filter circuit configured to filter the voltage signal when the switch is turned off, in order to obtain the current detection signal.

6. The current control circuit of claim 1, wherein the switched capacitor converter further comprises:
   a) a plurality of second switch groups coupled in parallel between an output terminal and the ground, wherein each second switch group comprises two switches coupled in series; and
   b) a plurality of isolated capacitors respectively coupled between an intermediate node of one corresponding first switch group and an intermediate node of one corresponding second switch group.

7. The current control circuit of claim 6, wherein the current detection circuit is configured to sample a current flowing through any one of the switches in the second switch group, in order to generate the current detection signal.

8. The current control circuit of claim 1, wherein the current detection circuit is configured to sample the output current to generate the current detection signal.

9. The current control circuit of claim 1, wherein the voltage regulation circuit further comprises:
   a) a first compensation circuit configured to generate a first compensation signal in accordance with the current detection signal and a predetermined value; and
   b) wherein the drive voltage control circuit is configured to adjust the drive voltage of the switch in accordance with the first compensation signal.

10. The current control circuit of claim 9, wherein:
    a) when the current detection signal is greater than the predetermined value, the drive voltage is decreased in accordance with the first compensation signal; and
    b) when the current detection signal is less than the predetermined value, the drive voltage is increased in accordance with the first compensation signal.

11. The current control circuit of claim 9, wherein the drive voltage control circuit comprises:
    a) a second compensation circuit configured to generate a second compensation signal in accordance with the first compensation signal and the drive voltage of the at least one switch in the first switch group; and
    b) a switch regulation circuit configured to adjust the drive voltage based on the second compensation signal, such that the output current is adjusted below a rated current.

12. The current control circuit of claim 11, wherein:
    a) the switch regulation circuit comprises a regulation switch; and
    b) a conduction voltage drop of the regulation switch is adjusted by the second compensation signal to adjust the drive voltage.

13. The current control circuit of claim 12, wherein:
    a) a first power terminal of the regulation switch receives a voltage source;
    b) a second power terminal of the regulation switch generates a drive voltage signal that characterizes the drive voltage; and
    c) a control terminal of the regulation switch is controlled by the second compensation signal.

14. A current control method, comprising:
    a) obtaining a current detection signal for characterizing an output current of a switched capacitor converter, wherein the switched capacitor converter comprises a plurality of first switch groups coupled between an input terminal and a ground, and wherein each first switch group comprises two switches coupled in series; and
    b) regulating the output current by adjusting an equivalent impedance of the switched capacitor converter comprising adjusting a drive voltage of at least one switch in the first switch group.

15. The method of claim 14, wherein the obtaining the current detection signal comprises sampling a current flowing through any one of the switches in the first switch group connected to the ground, in order to generate the current detection signal, wherein a load is coupled in parallel with the first switch group that is connected to the ground.

16. The method of claim 15, further comprising:
    a) sampling the current flowing the switch when the switch is turned on;
    b) converting the current into a voltage signal; and
    c) filtering the voltage signal when the switch is turned off to obtain the current detection signal.

17. The method of claim 14, wherein the obtaining the current detection signal comprises sampling a current flowing through any one of switches in a second switch group, in order to generate the current detection signal, wherein a plurality of second switch groups are coupled in parallel between an output terminal of the switched capacitor converter and the ground, and a plurality of isolated capacitors are respectively coupled between an intermediate node of one first switch group and an intermediate node of one second switch group.

18. The method of claim 14, further comprising:
    a) generating a first compensation signal in accordance with the current detection signal and a predetermined value; and
    b) adjusting the drive voltage of the at least one switch in the first switch group based on the first compensation signal.

19. The method of claim 18, further comprising:
    a) generating a second compensation signal in accordance with the first compensation signal and the drive voltage of the at least one switch in the first switch group; and
    b) adjusting the drive voltage based on the second compensation signal.

* * * * *